(12) United States Patent
Tseng et al.

(10) Patent No.: US 7,957,045 B2
(45) Date of Patent: Jun. 7, 2011

(54) HOLOGRAM MEDIA READING APPARATUS

(75) Inventors: Chien-Fu Tseng, Yunlin County (TW); Feng-Hsiang Lo, Hsinchu County (TW); Jenn-Hwan Tarng, Hsinchu (TW); Chih-Ming Lin, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 457 days.

(21) Appl. No.: 12/211,108

(22) Filed: Sep. 16, 2008

(65) Prior Publication Data
US 2009/0237762 A1 Sep. 24, 2009

(30) Foreign Application Priority Data
Mar. 19, 2008 (TW) ............................ 97204711 U (51) Int. Cl.
*G03H 1/26* (2006.01)
(52) U.S. Cl. ............... 359/22; 359/29; 359/32; 369/103
(58) Field of Classification Search .................... 359/22, 359/29, 32; 369/103
See application file for complete search history.

(56) References Cited

U.S. PATENT DOCUMENTS

| 7,092,133 | B2 | 8/2006 | Anderson et al. | |
|---|---|---|---|---|
| 7,167,286 | B2 | 1/2007 | Anderson et al. | |
| 2005/0260508 | A1* | 11/2005 | Lizotte | 430/5 |
| 2009/0262406 | A1* | 10/2009 | Hara | 359/11 |

* cited by examiner

Primary Examiner — Alessandro Amari
(74) Attorney, Agent, or Firm — Jianq Chyun IP Office (57) ABSTRACT

A hologram media reading apparatus including a reference light source, a stop with gray level aperture, and an optical sensor is provided. The reference light source is disposed on one side of a hologram medium, and capable of emitting a reference light beam. The reference light beam is transmitted to the hologram medium. The stop with gray level aperture and the reference light source are disposed on the same side or opposite sides of the hologram medium. The stop with gray level aperture has a light transmissive region, an opaque region, and a transmittance gradually varying region. The opaque region surrounds the light transmissive region. The transmittance gradually varying region surrounds the light transmissive region. A part of the reference beam from the hologram medium passes through the stop with gray level aperture and is transmitted to the optical sensor.

23 Claims, 8 Drawing Sheets

HOLOGRAM MEDIA READING APPARATUS

CROSS-REFERENCE TO RELATED APPLICATION

This application claims the priority benefit of Taiwan application serial no. 97204711, filed on Mar. 19, 2008. The entirety of the above-mentioned patent application is hereby incorporated by reference herein and made a part of specification.

BACKGROUND OF THE INVENTION

1. Field of the Invention

The present invention relates to a data reading apparatus. More particularly, the present invention relates to a hologram media reading apparatus.

2. Description of Related Art

With development of storage technique, a compact disc (CD) using such technique may have advantages of large storage capacity, easy preservation, long duration of preservation, low cost and non-easiness of damage of data, etc., and data stored within the CD may be easily read via a CD-ROM. Generally, a read and write method of the CD is to focus a laser light on the CD via an objective lens, so as to perform the read and write operation, and a storage capacity of the CD is determined based on an area size of the CD. In case the area size of the CD is fixed, if the storage capacity thereof is required to be further increased, a recording density of the CD has to be improved, or a wavelength of the laser light has to be shortened. However, limited by a physical limitation of diffraction limit, increasing of the storage capacity of the CD is bottlenecked.

To solve the above problem, hologram CDs and near-field optic CDs developed based on a hologram technique and a near-field optic technique are provided, so as to greatly increase the storage capacity. Since the storage capacity of the hologram CD may be one terabytes (TBs) or more, and a reading speed of the hologram CD via a hologram CD-ROM is more than 100 megabytes (MBs) per second, a combination of the hologram CD and the hologram CD-ROM then becomes a most potential super-capacity data storage solution.

A U.S. Pat. No. 7,167,286 (which is referred to as patent '286 hereinafter) discloses a hologram read and write apparatus shown in FIG. 3 thereof. When data stored on a hologram medium is read via such hologram read and write apparatus, after a reference light beam passes through a hologram on the hologram medium, a part of the reference light beam may pass through an aperture stop, i.e. a filter block shown in FIG. 4 of the patent '286. The aperture stop has a real aperture, so that the reference light beam projected on the real aperture may pass therethrough and may be transmitted to an optical detector. On the other hand, the reference light beam projected outside the real aperture is shielded. When the reference light beam is projected on the hologram medium, it may strike a plurality of holograms overlapping one another. By shielding a part of the reference light beam via the aperture stop, the reference light beam projected to the optical detector may carry data of only one of the holograms, and data of other holograms may be filtered out.

However, since light transmittance on the edge of the real aperture may be varied sharply, an obvious diffraction effect may be generated when the reference light beam passes through the real aperture, which may lead to an inter-pixel interference. Accordingly, an error rate for reading the data from the hologram medium is increased.

SUMMARY OF THE INVENTION

The present invention is directed to a hologram media reading apparatus, which may effectively reduce an error rate of data reading.

The present invention is directed to a hologram media reading apparatus having a relatively high data reading correctness.

The present invention provides a hologram media reading apparatus adapted to read hologram data on a hologram medium. The hologram media reading apparatus includes a reference light source, a stop with gray level aperture, and an optical sensor. The reference light source is disposed on one side of the hologram medium, and capable of emitting a reference light beam. The reference light beam is transmitted to the hologram medium. The stop with gray level aperture is disposed on the side or another side of the hologram medium. The stop with gray level aperture has a light transmissive region, an opaque region, and a transmittance gradually varying region. The opaque region surrounds the light transmissive region. The transmittance gradually varying region surrounds the light transmissive region. An inner edge of the transmittance gradually varying region is adjacent to the light transmissive region, and an outer edge of the transmittance gradually varying region is adjacent to the opaque region. Light transmittance of the transmittance gradually varying region decreases from the inner edge to the outer edge gradually. A part of the reference light beam from the hologram medium passes through the stop with gray level aperture. The optical sensor is disposed on an optical path of the reference light beam passing through the stop with gray level aperture.

The present invention further provides a hologram media reading apparatus adapted to read hologram data on a hologram medium. The hologram media reading apparatus includes a reference light source, a stop with gray level aperture, and an optical sensor. The reference light source is disposed on one side of the hologram medium, and capable of emitting a reference light beam. The reference light beam is transmitted to the hologram medium. The stop with gray level aperture is disposed on the side or another side of the hologram medium. A part of the reference light beam from the hologram medium passes through the stop with gray level aperture. The optical sensor is disposed on an optical path of the reference light beam passing through the stop with gray level aperture. The stop with gray level aperture is disposed on an x-y coordinate plane defined by an x-axis and a y-axis perpendicular to the x-axis. The stop with gray level aperture has an optical aperture function (OAF) OAF (x,y) corresponding to light transmittance.

$$OAF(x, y) = f(x)f(y),$$

$$f(x) = \begin{cases} 1 & \text{when } 0 \le |x| \le \frac{(1-\beta)D_x}{2} \\ g(x) & \text{when } \frac{(1-\beta)D_x}{2} < |x| < \frac{(1+\beta)D_x}{2} \\ 0 & \text{when } |x| \ge \frac{(1+\beta)D_x}{2} \end{cases}, \text{ and}$$

$$f(y) = \begin{cases} 1 & \text{when } 0 \le |y| \le \frac{(1-\beta)D_y}{2} \\ g(y) & \text{when } \frac{(1-\beta)D_y}{2} < |y| < \frac{(1+\beta)D_y}{2} \\ 0 & \text{when } |y| \ge \frac{(1+\beta)D_y}{2} \end{cases},$$

wherein $D_x > 0$, $D_y > 0$, $0 < \beta \le 1$, $0 < g(x) < 1$, $g(x)$ decreases gradually as $|x|$ increases gradually, $0 < g(y) < 1$, and $g(y)$ decreases gradually as $|y|$ increases gradually.

The present invention further provides a hologram media reading apparatus adapted to read hologram data on a hologram medium. The hologram media reading apparatus includes a reference light source, a stop with gray level aperture, and an optical sensor. The reference light source is disposed on one side of the hologram medium, and capable of emitting a reference light beam. The reference light beam is transmitted to the hologram medium. The stop with gray level aperture is disposed on the side or another side of the hologram medium. A part of the reference light beam from the hologram medium passes through the stop with gray level aperture. The optical sensor is disposed on an optical path of the reference light beam passing through the stop with gray level aperture. The stop with gray level aperture is disposed on an x-y coordinate plane defined by an x-axis and a y-axis perpendicular to the x-axis. The stop with gray level aperture has an optical aperture function (OAF) OAF (x,y) corresponding to the light transmittance.

$$OAF(x, y) = f(x)f(y),$$
$$f(x) = \begin{cases} 1 & \text{when } |x| = 0 \\ g(x) & \text{when } |x| > 0 \end{cases}, \text{and}$$
$$f(y) = \begin{cases} 1 & \text{when } |y| = 0 \\ g(y) & \text{when } |y| > 0 \end{cases},$$

wherein $0<g(x)<1$, $g(x)$ decreases gradually as $|x|$ increases gradually, $0<g(y)<1$, and $g(y)$ decreases gradually as $|y|$ increases gradually.

In the hologram media reading apparatus according to the embodiments of the present invention, since the transmittance gradually varying region which are partially transmissive surrounds the light transmissive region, a diffraction effect generated when the reference light beam passes through the stop with gray level aperture then may be effectively suppressed. By such means, the reference light beam then may project an image with a relatively high correctness onto the optical sensor, so that an error rate of data reading of the hologram media reading apparatus may be effectively reduced. In order to make the aforementioned and other objects, features and advantages of the present invention comprehensible, a preferred embodiment accompanied with figures is described in detail below.

DESCRIPTION OF EMBODIMENTS

Figure 1A:
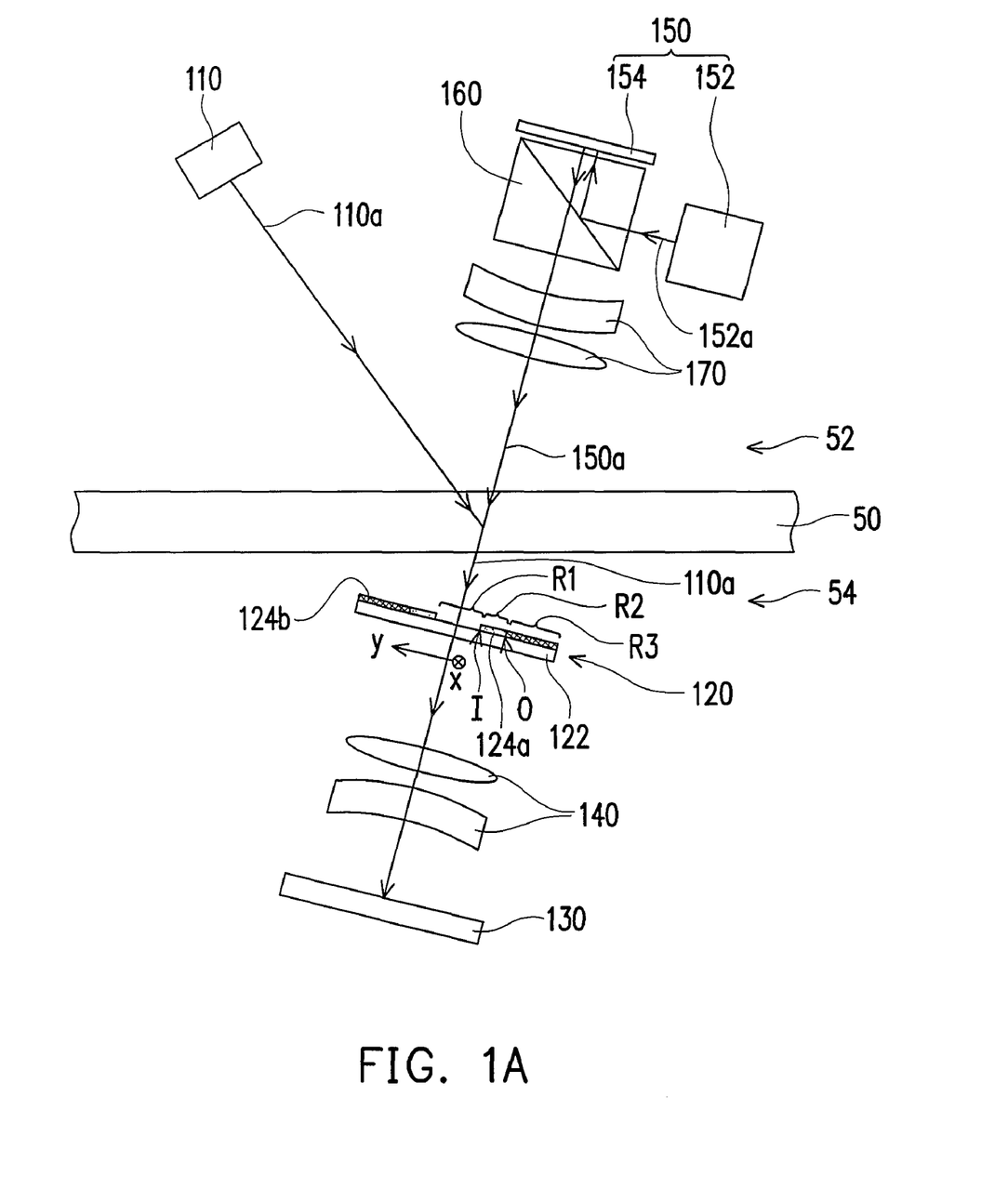
FIG. 1A is a structural diagram of a hologram media reading apparatus according to an embodiment of the present invention.
Figure 1B:
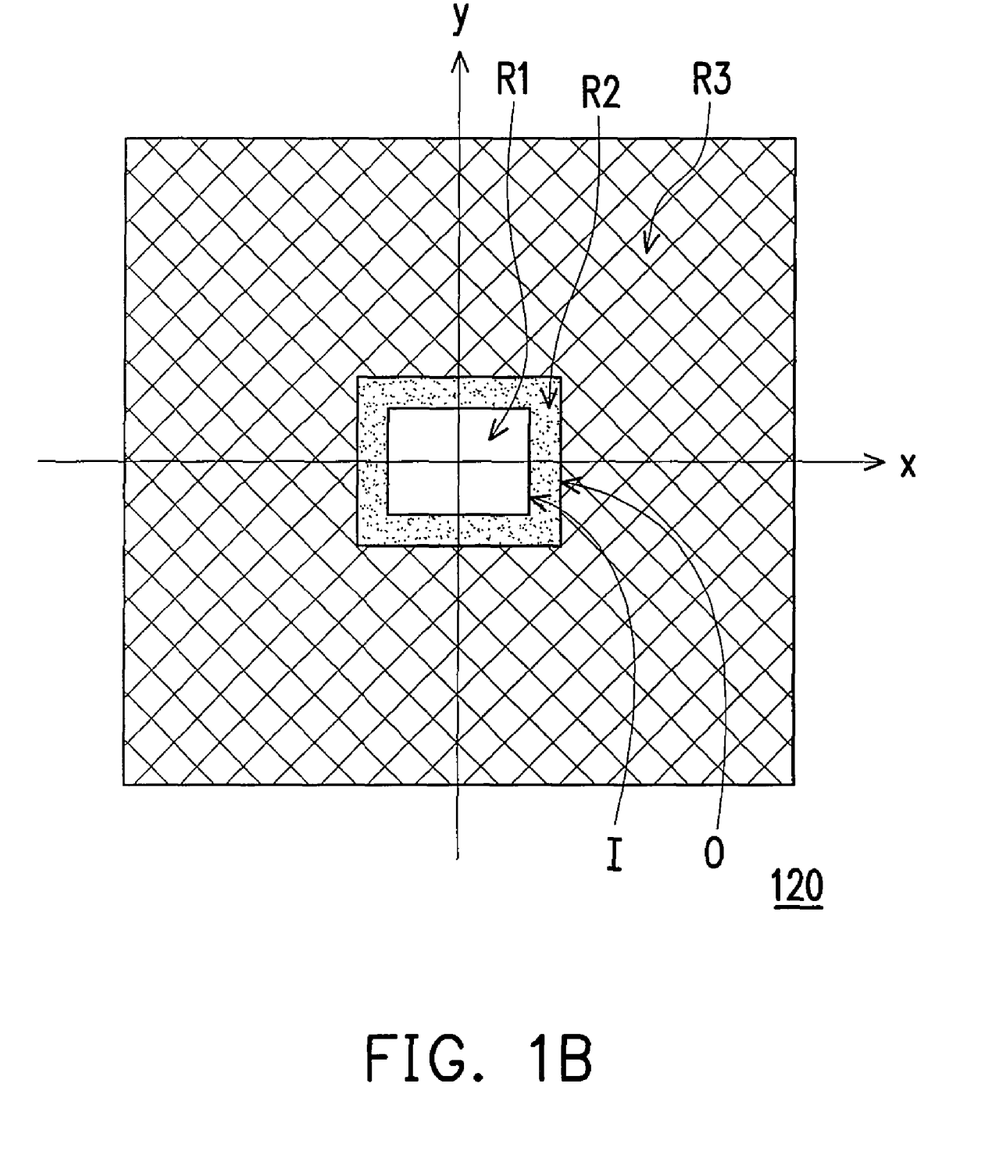
FIG. 1B is a front view of a stop with gray level aperture of FIG. 1A.

FIG. 1A is a structural diagram of a hologram media reading apparatus according to an embodiment of the present invention. FIG. 1B is a front view of a stop with gray level aperture of FIG. 1A. Referring to FIG. 1A and FIG. 1B, the hologram media reading apparatus 100 is adapted to read hologram data on a hologram medium 50. The hologram media reading apparatus 100 includes a reference light source 110, a stop with gray level aperture 120, and an optical sensor 130. The reference light source 110 is disposed on a first side 52 of the hologram medium 50, and capable of emitting a reference light beam 110a. In the present embodiment, the reference light beam 110a may be a coherence light beam. The reference light beam 110a may be transmitted to the hologram medium 50, and then the reference light beam 110a may carry the hologram data stored within the hologram medium 50 and is transmitted to the stop with gray level aperture 120 located on a second side 54 of the hologram medium 50.

The stop with gray level aperture 120 has a light transmissive region R1, an opaque region R3, and a transmittance gradually varying region R2. The opaque region R3 surrounds the light transmissive region R1. The transmittance gradually varying region R2 surrounds the light transmissive region R1. An inner edge I of the transmittance gradually varying region R2 is adjacent to the light transmissive region R1, and an outer edge O of the transmittance gradually varying region R2 is adjacent to the opaque region R3. Light transmittance of the transmittance gradually varying region R2 decreases from the inner edge I to the outer edge O gradually. To be specific, the stop with gray level aperture 120 may include a substrate 122 and an optical film 124a. The substrate 122 is, for example, a transparent substrate. The optical film 124a is disposed on the substrate 122, and is located in the transmittance gradually varying region R2. The light transmittance of the optical film 124a decreases from the inner edge I to the outer edge O of the transmittance gradually varying region R2 gradually. Moreover, an opaque film 124b may further be disposed on the substrate 122 and located in the opaque region R3, so as to shield the reference light beam 110a. A part of the reference light beam 110a from the hologram medium 50 passes through the stop with gray level aperture 120. The optical sensor 130 is disposed on an optical path of the reference light beam 110a passing through the stop with gray level aperture 120 for reading the hologram data carried by the reference light beam 110a. In the present embodiment, the optical sensor 130 may be a charge coupled device (CCD), a complementary metal-oxide-semiconductor sensor (CMOS sensor) or other suitable optical sensors.

In the present embodiment, the hologram media reading apparatus 100 may further include at least a lens 140 disposed on the optical path of the reference light beam 110a, and located between the stop with gray level aperture 120 and the optical sensor 130. The lens 140 is, for example, a Fourier transform lens.

In the hologram media reading apparatus 100 of the present embodiment, since variation of the light transmittance on the edge of the transmissive region R1 is not so sharp as that on the edge of a conventional real aperture, and the light transmittance of the transmittance gradually varying region R2 decreases from the inner edge I to the outer edge O gradually, a diffraction effect generated when the reference light beam 110a passes through the stop gray level aperture 120 is less obvious. Therefore, diffraction fringes projected on the optical sensor 130 by the reference light beam 110a may be effectively suppressed, and accordingly inter-pixel interference may be greatly reduced, and reading correctness of the hologram data may be improved.

In the present invention, the stop gray level aperture 120 is disposed on an x-y coordinate plane defined by an x-axis and a y-axis perpendicular to the x-axis. The stop with gray level aperture 120 has a first optical aperture function (OAF) OAF1(x,y) corresponding to light transmittance.

$$f1(x) = \begin{cases} 1 & \text{when } 0 \leq |x| \leq \frac{(1-\beta)D_x}{2} \\ g1(x) & \text{when } \frac{(1-\beta)D_x}{2} < |x| < \frac{(1+\beta)D_x}{2} \text{, and} \\ 0 & \text{when } |x| \geq \frac{(1+\beta)D_x}{2} \end{cases}$$

$$f1(y) = \begin{cases} 1 & \text{when } 0 \leq |y| \leq \frac{(1-\beta)D_y}{2} \\ g1(y) & \text{when } \frac{(1-\beta)D_y}{2} < |y| < \frac{(1+\beta)D_y}{2} \text{,} \\ 0 & \text{when } |y| \geq \frac{(1+\beta)D_y}{2} \end{cases}$$

wherein $D_x > 0$, $D_y > 0$, $0 < \beta \leq 1$, $0 < g1(x) < 1$, $g1(x)$ decreases gradually as $|x|$ increases gradually, $0 < g1(y) < 1$, and $g1(y)$ decreases gradually as $|y|$ increases gradually. To be specific, in the present embodiment, $$g1(x) = \frac{1}{2}\left(1 + \cos\left(\frac{\pi}{D_x\beta}\left(|x| - \frac{(1-\beta)D_x}{2}\right)\right)\right) \text{ and}$$

$$g1(y) = \frac{1}{2}\left(1 + \cos\left(\frac{\pi}{D_y\beta}\left(|y| - \frac{(1-\beta)D_y}{2}\right)\right)\right).$$

Moreover, in the present embodiment, distribution of the light transmittance of the optical film 124a and the opaque film 124b on the x-y coordinate plane corresponds to the first optical aperture function OAF1(x,y). In other words, the transmissive region R1 falls within a range between $$0 \leq |x| \leq \frac{(1-\beta)D_x}{2} \text{ and } 0 \leq |y| \leq \frac{(1-\beta)D_y}{2},$$

the transmittance gradually varying region R2 falls within a range between $$\frac{(1-\beta)D_x}{2} < |x| < \frac{(1+\beta)D_x}{2} \text{ and}$$
$$\frac{(1-\beta)D_y}{2} < |y| < \frac{(1+\beta)D_y}{2},$$

and the opaque region R3 falls within a range between $$|x| \geq \frac{(1+\beta)D_x}{2} \text{ and } |y| \geq \frac{(1+\beta)D_y}{2}.$$

Figure 2A:
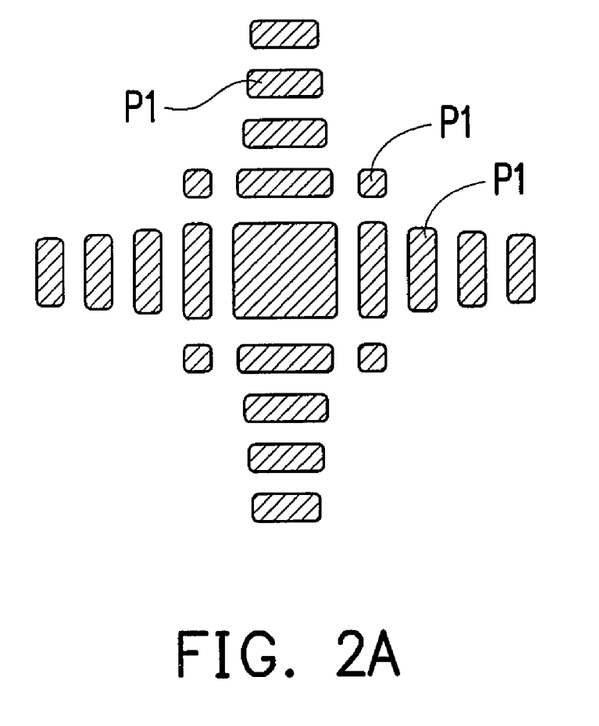
FIG. 2A is a diagram illustrating a point spread function (PSF) generated after a reference light beam passes through a stop with a real aperture when β=0.
Figure 2B:
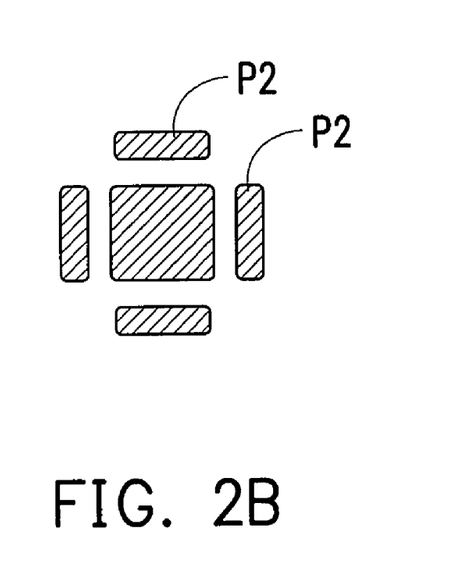
FIG. 2B is a diagram illustrating a PSF generated after a reference light beam passes through a stop with gray level aperture when β=0.5.

It should be noted that in the present embodiment, $0 < \beta \leq 1$. However, when $\beta = 0$, it represents there is a stop with a real aperture. FIG. 2A is a diagram illustrating a point spread function (PSF) generated after a reference light beam passes through a stop with a real aperture when $\beta = 0$. FIG. 2B is a diagram illustrating a PSF generated after the reference light beam 110a passes through the stop with gray level aperture 120 when $\beta = 0.5$. FIG. 2A is a diagram simulating a PSF under conditions when $D_x = D_y = 800$ micrometers, $\beta = 0$, an effective focal length of the lens 140 is 20 millimetres, a wavelength of the reference light beam 110a is 405 nanometers, and a width of a Nyquist aperture is 1013 micrometers. According to FIG. 2A, there is a plurality of obvious diffraction fringes P1 in the PSF when $\beta = 0$. In other words, the reference light beam passing through the stop with the real aperture may project an image with more and obvious diffraction fringes on the optical sensor, which may leads to an excessive inter-pixel interference. On the other hand, FIG. 2B is a diagram simulating a PSF under conditions when $D_x = D_y = 800$ micrometers, $\beta = 0.5$, the effective focal length of the lens 140 is 20 millimetres, the wavelength of the reference light beam 110a is 405 nanometers, and the width of a Nyquist aperture is 1013 micrometers. According to FIG. 2B, diffraction fringes P2 in the PSF is rather less and non-obvious when $\beta = 0.5$, and therefore the reference light beam 110a passing through the stop with gray level aperture 120 may project an image with relatively less and non-obvious diffraction fringes on the optical sensor 130.

Figure 3A:
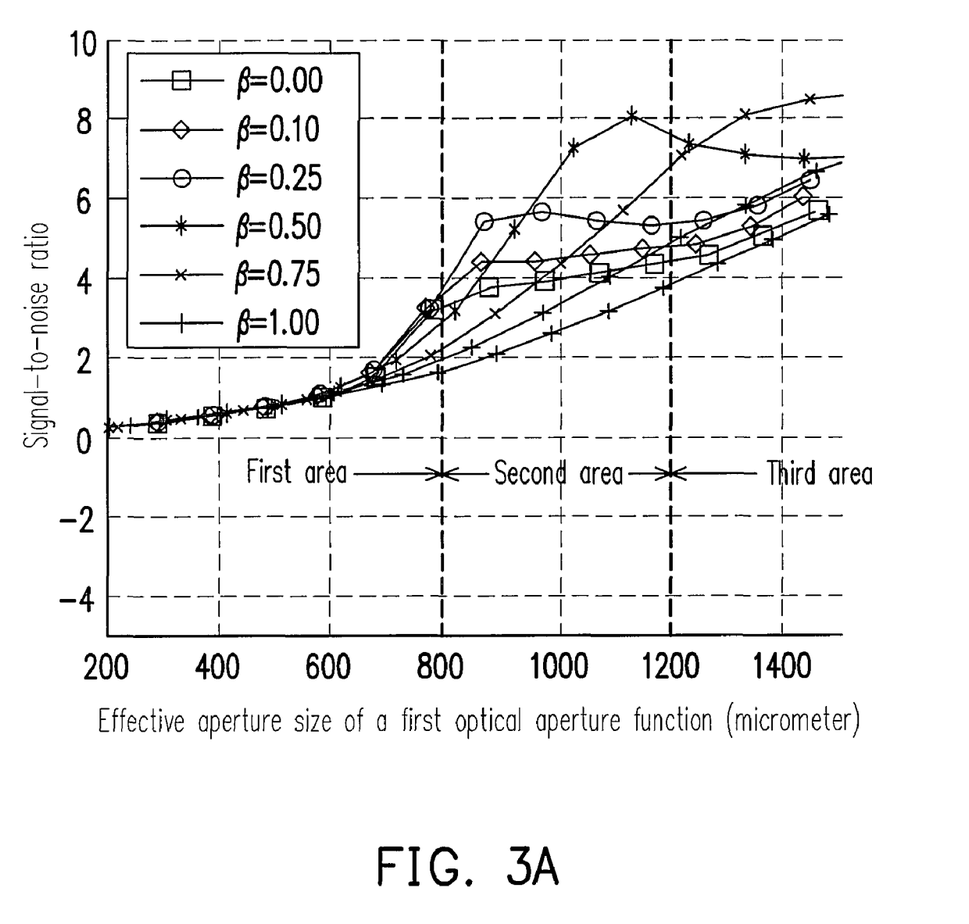
FIG. 3A is a diagram illustrating a relation between signal-to-nose ratios (SNRs) of images detected by an optical sensor and effective aperture sizes of a first optical aperture function.
Figure 3B:
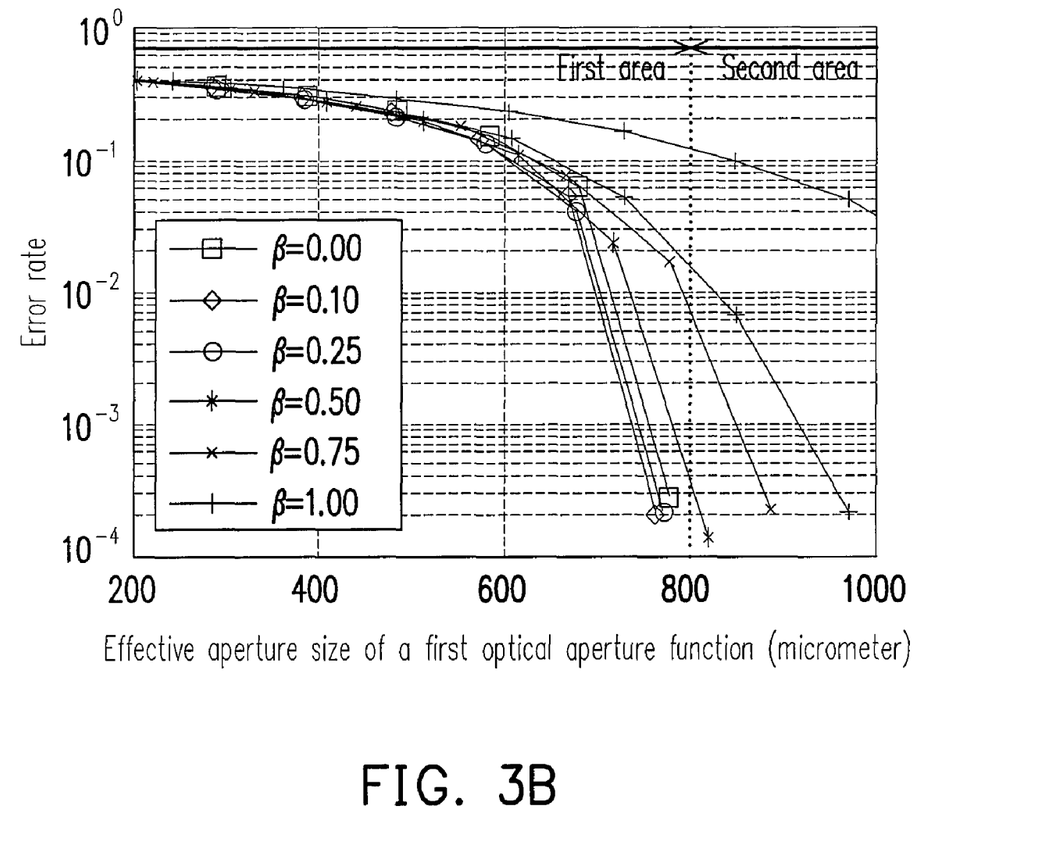
FIG. 3B is a diagram illustrating a relation between error rates of images detected by an optical sensor and effective aperture sizes of a first optical aperture function.
Figure 3C:
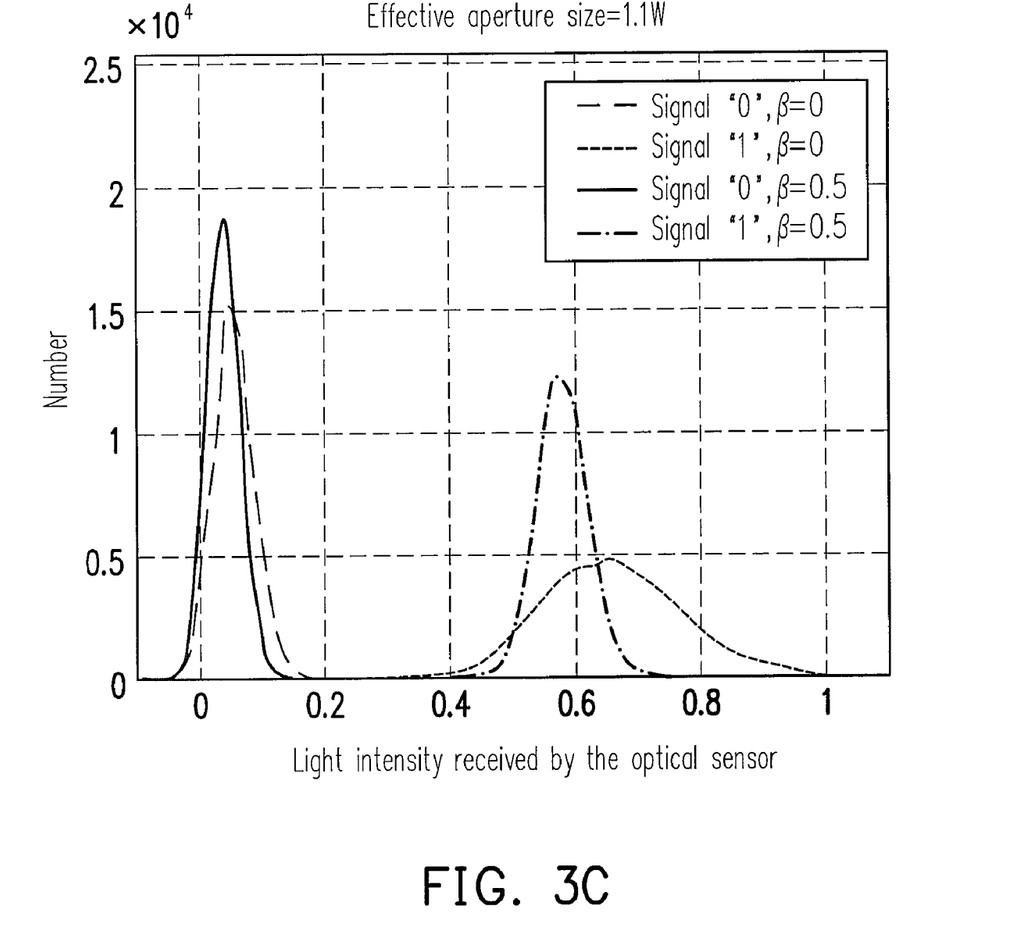
FIG. 3C is a diagram illustrating a distribution of numbers of signals "0" and signals "1" of images detected by an optical sensor under different light intensity.

FIG. 3A is a diagram illustrating a relation between signal-to-nose ratios (SNRs) of images detected by an optical sensor and effective aperture sizes of a first optical aperture function OAF1(x,y). FIG. 3B is a diagram illustrating a relation between error rates of images detected by an optical sensor and effective aperture sizes of a first optical aperture function OAF1(x,y). FIG. 3C is a diagram illustrating a distribution of numbers of signals "0" and signals "1" of images detected by an optical sensor under different light intensity. According to FIG. 3A and FIG. 3B, when the effective aperture size falls within a first area, i.e. falls within an area less than 800 micrometers, the inter-pixel interference is severe, and the inter-pixel interference influences a data recovery error rate, wherein a degree of the inter-pixel interference is inversely proportional to the SNR. In other words, the lower the SNR is, the greater the inter-pixel interference is. When the effective aperture size falls within a second area, i.e. falls within an area from 800 micrometers to 1200 micrometers, the inter-pixel interference is normal, and a noise margin is influenced. When the effective aperture size falls within a third area, i.e. falls within an area greater than 1200 micrometers, the inter-pixel interference nearly has no influence to the data recovery error rate. The greater the aperture size is, the greater the light energy passes therethrough, and the noise margin may be slightly increased, though an increasing degree thereof is relatively small. Moreover, according to FIG. 3A, when $\beta = 0.10 \sim 1.00$ (i.e. under an optical structure of the present embodiment), the SNRs in the third area are all greater than the SNRs when $\beta = 0$ (i.e. under a conventional optical structure with the real aperture). Accordingly, hologram media reading apparatus 100 of the present embodiment may effectively reduce the inter-pixel interference. Referring to FIG. 3C, when $\beta = 0.5$, full width at half maximum (FWHM) values of light intensity distribution curves of the signals "0" and the signals "1" are all smaller compared to that when $\beta = 0$, and therefore the error rate for data reading of the hologram media reading apparatus 100 is relatively low.

Referring to FIG. 1A and FIG. 1B again, formation of the stop with gray level aperture 120 is not limited to the substrate 122 and the optical film 124a. In other embodiments, the stop with gray level aperture may be a liquid crystal panel. When the liquid crystal panel is activated, the light transmittance of the liquid crystal panel in the transmissive region R1 is T1, and the light transmittance corresponding to the opaque region R3 is T2, wherein T1 is greater than T2. Moreover, the light transmittance of the liquid crystal panel in the transmittance gradually varying region R2 decreases from the inner edge I to the outer edge O gradually, and decreases from T1 to T2 gradually. To be specific, in an embodiment that is not illustrated, when the liquid crystal panel is activated, a distribution of the light transmittance of the liquid crystal panel on the x-y coordinate plane corresponds to the first optical aperture function OAF1(x,y).

In the present embodiment, the hologram media reading apparatus 100 further includes a signal light source 150 disposed at the first side 52 of the hologram medium 50, and adapted to provide a signal light beam 150a. To be specific, the signal light source 150 includes an illumination light source 152 and a spatial light modulator (SLM) 154. The illumination light source 152 is adapted to provide an illumination light beam 152a. The SLM 154 is disposed on an optical path of the illumination light beam 152a and is adapted to transform the illumination light beam 152a into the signal light beam 150a. In the present embodiment, the SLM 154 may be a liquid-crystal-on-silicon panel (LCOS panel), a digital micro-mirror device (DMD) or other reflective light valves. A polarizing beam splitter (PBS) 160 may be disposed on the optical paths of the illumination light beam 152a and the signal light beam 150a. In the present embodiment, the PBS 160 may be a polarizing beam splitting prism. However, in other embodiments, the PBS may also be a polarizing beam splitting plate. It should be noted that SLM 154 is not limited to the reflective light valve. In other embodiments, the SLM may also be a transmissive light valve, and the transmissive light valve does not require the PBS for arranging the optical path. The transmissive light valve may be the liquid crystal panel.

The signal light beam 150a from the signal light source 150 may be transmitted to the hologram medium 50, and a region on the hologram medium 50 struck by the signal light beam 150a at least partially overlaps a region on the hologram medium 50 struck by the reference light beam 110a. In the present embodiment, the hologram media reading apparatus 100 further includes at least a lens 170 disposed on an optical path of the signal light beam 150a and located between the signal light source 150 and the hologram medium 50. The lens 170 may be a Fourier transform lens. By such means, the hologram media reading apparatus 100 may then be a hologram media reading and writing apparatus which may write data into the hologram medium 50 and read data from the hologram medium 50. However, in other embodiments, the signal light source may not be included in the hologram media reading apparatus, and therefore the hologram media reading apparatus may only has a function of reading data from the hologram medium, and does not have a function of writing data into the hologram medium.

Moreover, the hologram media reading apparatus 100 may further be designed to generate a specific hologram channel, and may be operated in coordination with a modulation codes technique and advanced decoding techniques such as: maximum likelihood decoding, maximum-a-posteriori decoding (MAP decoding), etc., so as to achieve a higher capacity and a lower reading error rate. For example, in the present embodiment, a specific partial response channel may be generated, and a signal response may be performed via a maximum likelihood detector. The partial response channel may be one-dimensional, such as [11], [121], [1221], [12421], etc, or may be two-dimensional, such as [11;11], [121;242;121], etc.

Figure 4:
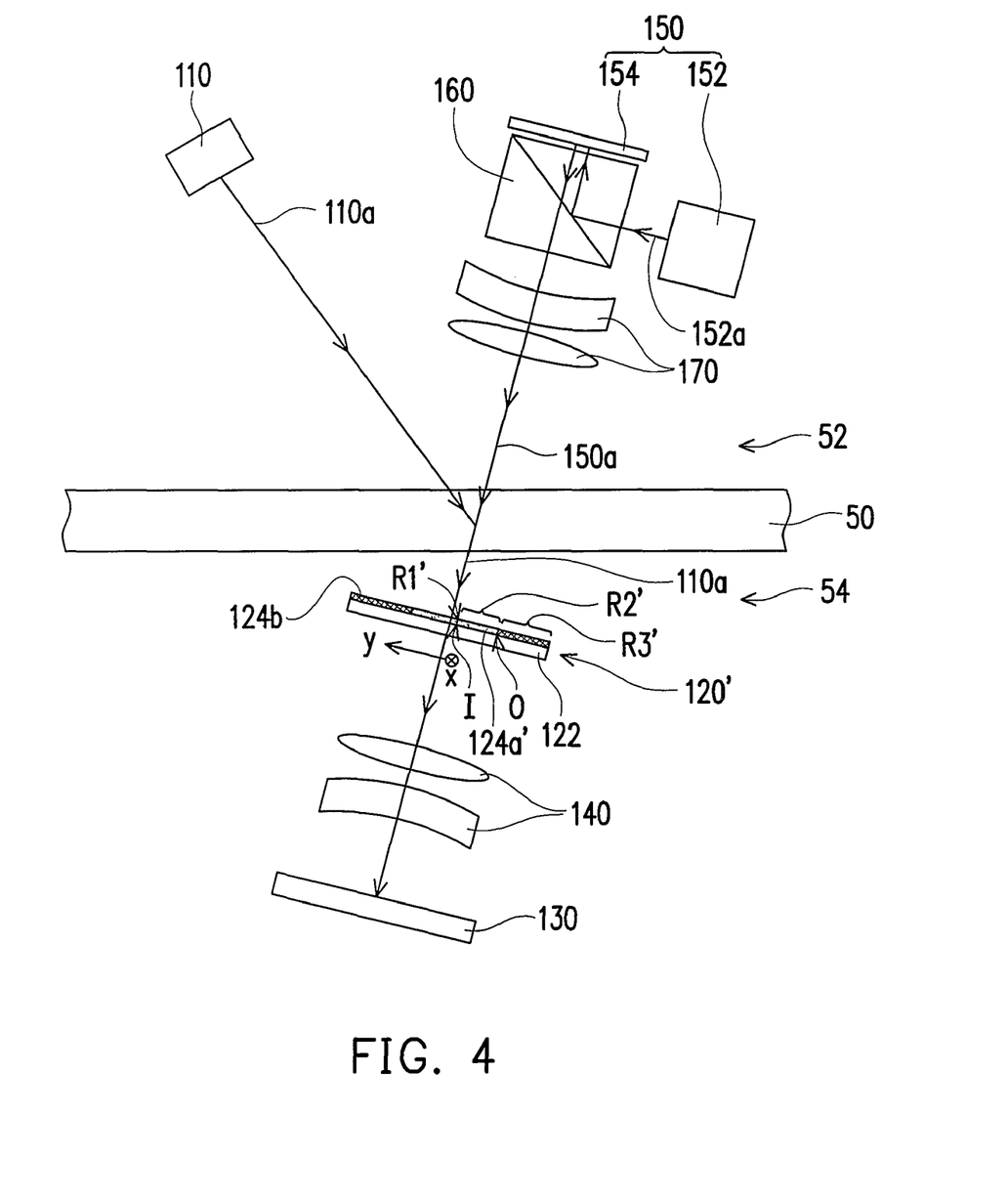
FIG. 4 is a structural diagram illustrating a hologram media reading apparatus according to another embodiment of the present invention.

FIG. 4 is a structural diagram illustrating a hologram media reading apparatus according to another embodiment of the present invention. Referring to FIG. 4, the hologram media reading apparatus 100' of the present embodiment is similar to the aforementioned hologram media reading apparatus 100 (as shown in FIG. 1A), and the differences therebetween are as follows. In the hologram media reading apparatus 100', a transmissive region R1' of a stop with gray level aperture 120' is only a point, an inter edge I of a transmittance gradually varying region R2' is adjacent to the light transmissive region R1', and an outer edge O of the transmittance gradually varying region R2' is adjacent to an opaque region R3'. In the present embodiment, the stop with gray level aperture 120' has a second optical aperture function OAF2(x,y) corresponding to the light transmittance, wherein OAF2(x,y)=f2(x)f2(y), and $$f2(x) = \begin{cases} 1 & \text{when } |x| = 0 \\ g2(x) & \text{when } |x| > 0 \end{cases}, \text{ and}$$

$$f2(y) = \begin{cases} 1 & \text{when } |y| = 0 \\ g2(y) & \text{when } |y| > 0 \end{cases},$$

wherein 0<g2(x)<1, g2(x) decreases gradually as |x| increases gradually, 0<g2(y)<1, and g2(y) decreases gradually as |y| increases gradually. Moreover, distribution of the light transmittance of an optical film 124a' on the x-y coordinate plane corresponds to the second optical aperture function OAF2(x,y). To be specific, in the present invention, $$g2(x) = \exp\left(\frac{-x^2}{2\sigma_x^2}\right), \text{ and } g2(y) = \exp\left(\frac{-y^2}{2\sigma_y^2}\right),$$

wherein $\sigma_x$>0, and a $\sigma_y$>0. In other words, the transmissive region R1' falls within a position where |x|=0 and |y|=0, and the transmittance gradually varying region R2' falls within a range where |x|>0 and |y|>0.

The hologram media reading apparatus 100' has similar functions as those of the aforementioned hologram media reading apparatus 100 (as shown in FIG. 1A), and therefore detailed description thereof will not be repeated. Moreover, in other embodiments, the stop with gray level aperture 120' may also be replaced with a liquid crystal panel.

Figure 5:
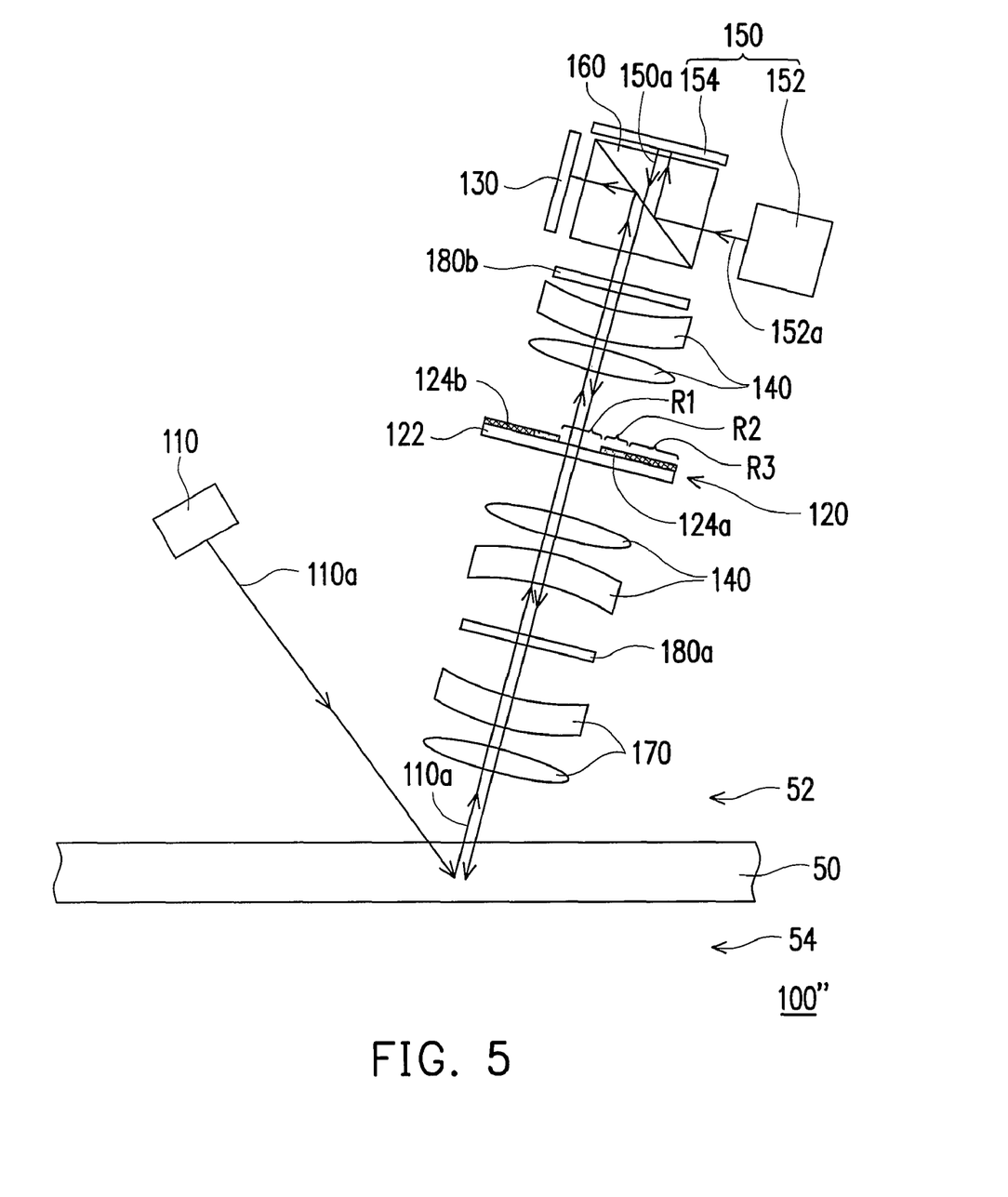
FIG. 5 is a structural diagram illustrating a hologram media reading apparatus according to still another embodiment of the present invention.

FIG. 5 is a structural diagram illustrating a hologram media reading apparatus according to still another embodiment of the present invention. Referring to FIG. 5, the hologram media reading apparatus 100" of the present embodiment is similar to the aforementioned hologram media reading apparatus 100 (as shown in FIG. 1A), the differences therebetween are as follows. In the hologram media reading apparatus 100", the stop with gray level aperture 120 and the optical sensor 130 are disposed on the first side 52 of the hologram medium 50. In the present embodiment, the lens 140 is also disposed on the first side 52. To be specific, after the reference light beam 110a is transmitted to the hologram medium 50, the reference light beam 110a may carry the hologram data stored within the hologram medium 50, and may be reflected to the stop with gray level aperture 120. In the present embodiment, the optical sensor 130 may be disposed on one side of the polarizing beam splitter 160, and the reference light beam 110a from the stop with gray level aperture 120 is transmitted to the optical sensor 130 via the polarizing beam splitter 160.

The hologram media reading apparatus 100" may further includes at least a waveplate for changing polarization states of the signal light beam 150a and the reference light beam 110a. In the present embodiment, two waveplates 180a and 180b may be disposed on the optical path of the reference light beam 110a between the optical sensor 130 and the hologram medium 50. One of the two waveplates 180a and 180b is adjustable, so that the hologram media reading apparatus 100" may be switched between a reading mode and a writing mode. Moreover, a lens 190 may be further disposed on the optical path of the reference light beam 110a between the optical sensor 130 and the hologram medium 50, and the lens 190 may be a Fourier transform lens.

It should be noted that the stop with gray level aperture 120 of the hologram media reading apparatus 100" may also be replaced by the stop with gray level apertures in other embodiments of the present invention, for example, may be replaced by the stop with gray level aperture 120' (as shown in FIG. 4) or the liquid crystal panel.

In summary, in the hologram media reading apparatus according to the embodiments of the present invention, since variation of the light transmittance on the edge of the transmissive region of the stop gray level aperture is not so sharp as that on the edge of a conventional real aperture, and the light transmittance of the transmittance gradually varying region decreases from the inner edge to the outer edge gradually, the diffraction effect generated after the reference light beam passing through the stop with gray level aperture is less obvious. Therefore, the diffraction fringes projected on the optical sensor by the reference light beam may then be effectively suppressed. By such means, the inter-pixel interference may be greatly reduced, and correctness of data reading of the hologram data may be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hologram media reading apparatus adapted to read hologram data on a hologram medium, the hologram media reading apparatus comprising:
a reference light source, disposed on a side of the hologram medium, capable of emitting a reference light beam, wherein the reference light beam is transmitted to the hologram medium;
a stop with gray level aperture, disposed on the side or another side of the hologram medium, and the stop with gray level aperture comprising:
a transmissive region;
an opaque region, surrounding the transmissive region;
a transmittance gradually varying region, surrounding the transmissive region, wherein an inner edge of the transmittance gradually varying region is adjacent to the light transmissive region, and an outer edge of the transmittance gradually varying region is adjacent to the opaque region, light transmittance of the transmittance gradually varying region decreases from the inner edge to the outer edge gradually, and a part of the reference light beam from the hologram medium passes through the stop with gray level aperture; and
an optical sensor, disposed on an optical path of the reference light beam passing through the stop with gray level aperture.

2. The hologram media reading apparatus as claimed in claim 1, wherein the stop with gray level aperture comprises:
a substrate; and
an optical film, disposed on the substrate, and located in the transmittance gradually varying region, wherein light transmittance of the optical film decreases from the inner edge to the outer edge of the transmittance gradually varying region gradually.

3. The hologram media reading apparatus as claimed in claim 1, wherein the stop with gray level aperture is a liquid crystal panel, and when the liquid crystal panel is activated, light transmittance of the liquid crystal panel in the transmissive region is T1, light transmittance of the liquid crystal panel in the opaque region is T2, T1 is greater than T2, light transmittance of the liquid crystal panel in the transmittance gradually varying region decreases from the inner edge to the outer edge gradually and decreases from T1 to T2 gradually.

4. The hologram media reading apparatus as claimed in claim 1 further comprising at least a lens disposed on the optical path of the reference light beam and located between the stop with gray level aperture and the optical sensor.

5. The hologram media reading apparatus as claimed in claim 1 further comprising a signal light source disposed on the side of the hologram medium and adapted to provide a signal light beam, wherein the signal light beam is transmitted to the hologram medium, and a region on the hologram medium struck by the signal light beam at least partially overlaps a region on the hologram medium struck by the reference light beam.

6. The hologram media reading apparatus as claimed in claim 5, wherein the signal light source comprises:
an illumination light source, adapted to provide an illumination light beam; and
a spatial light modulator, disposed on an optical path of the illumination light beam, and adapted to transform the illumination light beam into the signal light beam.

7. The hologram media reading apparatus as claimed in claim 5, wherein the stop with gray level aperture is disposed on the other side of the hologram medium, and the hologram media reading apparatus further comprises at least a lens disposed on an optical path of the signal light beam, and located between the signal light source and the hologram medium.

8. A hologram media reading apparatus adapted to read hologram data on a hologram medium, the hologram media reading apparatus comprising:
a reference light source, disposed on a side of the hologram medium, capable of emitting a reference light beam, wherein the reference light beam is transmitted to the hologram medium;
a stop with gray level aperture, disposed on the side or another side of the hologram medium, wherein a part of the reference light beam from the hologram medium passes through the stop with gray level aperture; and
an optical sensor, disposed on an optical path of the reference light beam passing through the stop with gray level aperture,
wherein, the stop with gray level aperture is disposed on an x-y coordinate plane defined by an x-axis and a y-axis perpendicular to the x-axis, the stop with gray level aperture has an optical aperture function OAF (x,y) corresponding to light transmittance, wherein OAF(x,y)= f(x)f(y), and $$f(x) = \begin{cases} 1 & \text{when } 0 \leq |x| \leq \frac{(1-\beta)D_x}{2} \\ g(x) & \text{when } \frac{(1-\beta)D_x}{2} < |x| < \frac{(1+\beta)D_x}{2} \\ 0 & \text{when } |x| \geq \frac{(1+\beta)D_x}{2} \end{cases}, \text{ and}$$

$$f(y) = \begin{cases} 1 & \text{when } 0 \leq |y| \leq \frac{(1-\beta)D_y}{2} \\ g(y) & \text{when } \frac{(1-\beta)D_y}{2} < |y| < \frac{(1+\beta)D_y}{2} \\ 0 & \text{when } |y| \geq \frac{(1+\beta)D_y}{2} \end{cases},$$

wherein $D_x > 0$, $D_y > 0$, $0 < \beta \leq 1$, $0 < g(x) < 1$, and $g(x)$ decreases gradually as $|x|$ increases gradually, $0 < g(y) < 1$, and $g(y)$ decreases gradually as $|j|$ increases gradually.

9. The hologram media reading apparatus as claimed in claim 8, wherein $$g(x) = \frac{1}{2}\left(1 + \cos\left(\frac{\pi}{D_x \beta}\left(|x| - \frac{(1-\beta)D_x}{2}\right)\right)\right), \text{ and}$$

$$g(y) = \frac{1}{2}\left(1 + \cos\left(\frac{\pi}{D_y \beta}\left(|y| - \frac{(1-\beta)D_y}{2}\right)\right)\right).$$

10. The hologram media reading apparatus as claimed in claim 8, wherein the stop with gray level aperture comprises:
 a substrate; and
 an optical film, disposed on the substrate, wherein distribution of light transmittance of the optical film on the x-y coordinate plane corresponds to the optical aperture function OAF (x,y).

11. The hologram media reading apparatus as claimed in claim 8, wherein the stop with gray level aperture is a liquid crystal panel, and when the liquid crystal panel is activated, distribution of light transmittance of the liquid crystal panel on the x-y coordinate plane corresponds to the optical aperture function OAF (x,y).

12. The hologram media reading apparatus as claimed in claim 8 further comprising at least a lens disposed on the optical path of the reference light beam, and located between the stop with gray level aperture and the optical sensor.

13. The hologram media reading apparatus as claimed in claim 8 further comprising a signal light source disposed on the side of the hologram medium and adapted to provide a signal light beam, wherein the signal light beam is transmitted to the hologram medium, and a region on the hologram medium struck by the signal light beam at least partially overlaps a region on the hologram medium struck by the reference light beam.

14. The hologram media reading apparatus as claimed in claim 13, wherein the signal light source comprises:
 an illumination light source, adapted to provide an illumination light beam; and
 a spatial light modulator, disposed on an optical path of the illumination light beam, and adapted to transform the illumination light beam into the signal light beam.

15. The hologram media reading apparatus as claimed in claim 13, wherein the stop with gray level aperture is disposed on the other side of the hologram medium, and the hologram media reading apparatus further comprises at least a lens disposed on an optical path of the signal light beam, and located between the signal light source and the hologram medium.

16. A hologram media reading apparatus adapted to read hologram data on a hologram medium, the hologram media reading apparatus comprising:
 a reference light source, disposed on a side of the hologram medium, capable of emitting a reference light beam, wherein the reference light beam is transmitted to the hologram medium;
 a stop with gray level aperture, disposed on the side or another side of the hologram medium, wherein a part of the reference light beam from the hologram medium passes through the stop with gray level aperture; and
 an optical sensor, disposed on an optical path of the reference light beam passing through the stop with gray level aperture,
 wherein, the stop with gray level aperture is disposed on an x-y coordinate plane defined by an x-axis and a y-axis perpendicular to the x-axis, the stop with gray level aperture has an optical aperture function OAF (x,y) corresponding to light transmittance, wherein OAF(x,y)=f(x)f(y), and $$f(x) = \begin{cases} 1 & \text{when } |x| = 0 \\ g(x) & \text{when } |x| > 0 \end{cases}, \text{ and}$$

$$f(y) = \begin{cases} 1 & \text{when } |y| = 0 \\ g(y) & \text{when } |y| > 0 \end{cases},$$

wherein $0 < g(x) < 1$, $g(x)$ decreases gradually as $|x|$ increases gradually, $0 < g2(y) < 1$, and $g(y)$ decreases gradually as $|y|$ increases gradually.

17. The hologram media reading apparatus as claimed in claim 16, wherein $$g(x) = \exp\left(\frac{-x^2}{2\sigma_x^2}\right), g(y) = \exp\left(\frac{-y^2}{2\sigma_y^2}\right), \sigma_x > 0, \text{ and } \sigma_y > 0.$$

18. The hologram media reading apparatus as claimed in claim 16, wherein the stop with gray level aperture comprises:
 a substrate; and
 an optical film, disposed on the substrate, wherein distribution of light transmittance of the optical film on the x-y coordinate plane corresponds to the optical aperture function OAF (x,y).

19. The hologram media reading apparatus as claimed in claim 16, wherein the stop with gray level aperture is a liquid crystal panel, and when the liquid crystal panel is activated, distribution of light transmittance of the liquid crystal panel on the x-y coordinate plane corresponds to the optical aperture function OAF (x,y).

20. The hologram media reading apparatus as claimed in claim 16 further comprising at least a lens disposed on the optical path of the reference light beam, and located between the stop with gray level aperture and the optical sensor.

21. The hologram media reading apparatus as claimed in claim 16 further comprising a signal light source disposed on the side of the hologram medium and adapted to provide a signal light beam, wherein the signal light beam is transmitted to the hologram medium, and a region on the hologram medium struck by the signal light beam at least partially overlaps a region on the hologram medium struck by the reference light beam.

22. The hologram media reading apparatus as claimed in claim 21, wherein the signal light source comprises:
 an illumination light source, adapted to provide an illumination light beam; and a spatial light modulator, disposed on an optical path of the illumination light beam, and adapted to transform the illumination light beam into the signal light beam.

23. The hologram media reading apparatus as claimed in claim 21, wherein the stop with gray level aperture is disposed on the other side of the hologram medium, and the hologram media reading apparatus further comprises at least a lens disposed on an optical path of the signal light beam, and located between the signal light source and the hologram medium.

* * * * *